(12) United States Patent
Miyazaki

(10) Patent No.: US 11,220,008 B2
(45) Date of Patent: Jan. 11, 2022

(54) APPARATUS, METHOD, NON-TRANSITORY COMPUTER-READABLE RECORDING MEDIUM STORING PROGRAM, AND ROBOT

(71) Applicant: Panasonic Intellectual Property Management Co., Ltd., Osaka (JP)

(72) Inventor: Ryouta Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 271 days.

(21) Appl. No.: 16/027,215

(22) Filed: Jul. 3, 2018

(65) Prior Publication Data
US 2019/0022870 A1    Jan. 24, 2019

(30) Foreign Application Priority Data

Jul. 18, 2017 (JP) .............................. JP2017-139116
Jan. 19, 2018 (JP) .............................. JP2018-007252

(51) Int. Cl.
*B25J 11/00* (2006.01)
*B25J 9/16* (2006.01)
(Continued)

(52) U.S. Cl.
CPC ......... *B25J 11/0005* (2013.01); *B25J 9/1697* (2013.01); *G06K 9/00288* (2013.01); *G06N 3/008* (2013.01); *G10L 15/075* (2013.01)

(58) Field of Classification Search
CPC ...... B25J 11/0005; B25J 9/1697; B25J 9/161; B25J 9/1661; B25J 13/003; B25J 13/08;
(Continued)

(56) References Cited

U.S. PATENT DOCUMENTS

| 4,809,333 A | * | 2/1989 | Taylor ..................... G10L 15/10 |
| | | | 704/252 |
| RE45,870 E | * | 1/2016 | Wang ........................ B25J 5/007 |

(Continued)

FOREIGN PATENT DOCUMENTS

| EP | 2068275 A2 | 6/2009 |
| JP | 2007-152445 A | 6/2007 |

(Continued)

OTHER PUBLICATIONS

Simon Says Robot (Year: 2011).*
(Continued)

*Primary Examiner* — Jeff A Burke
*Assistant Examiner* — Kyle T Johnson
(74) *Attorney, Agent, or Firm* — Greenblum & Bernstein, P.L.C.

(57) ABSTRACT

A processor causes a robot to execute any one of a first, second, and third action as an initial action. The initial action is executed for communication with a target person according to a captured image and a captured sound. When a sound is acquired by a microphone after execution of the current action, the processor causes the robot to execute an action one-level higher than the current action. The current action includes the initial action. When the sound is not acquired, the processor determines whether a time elapsed from the execution of the current action is shorter than a threshold. When the time is shorter than the threshold, the processor causes the robot to continue the current action. When the time is equal to or longer than the threshold, the processor causes the robot to execute an action one-level lower than the current action.

17 Claims, 7 Drawing Sheets

(51) Int. Cl.
*G10L 15/07* (2013.01)
*G06N 3/00* (2006.01)
*G06K 9/00* (2006.01)

(58) Field of Classification Search
CPC ... G06K 9/00288; G06N 3/008; G10L 15/075
See application file for complete search history.

(56) References Cited

U.S. PATENT DOCUMENTS

| | | | | |
|---|---|---|---|---|
| 9,375,845 B1* | 6/2016 | Annan | ................ | B25J 11/0005 |
| 9,724,824 B1* | 8/2017 | Annan | ................ | B25J 11/0005 |
| 2005/0154265 A1* | 7/2005 | Miro | ................ | G10L 15/26 |
| | | | | 600/300 |
| 2007/0192910 A1* | 8/2007 | Vu | ................ | B25J 19/06 |
| | | | | 700/245 |
| 2007/0233318 A1* | 10/2007 | Lei | ................ | G05D 1/0038 |
| | | | | 700/245 |
| 2009/0149991 A1* | 6/2009 | Sumida | ................ | G06N 3/008 |
| | | | | 700/246 |
| 2010/0221978 A1* | 9/2010 | Long | ................ | A63H 3/28 |
| | | | | 446/298 |
| 2011/0288684 A1* | 11/2011 | Farlow | ................ | G05D 1/0038 |
| | | | | 700/264 |
| 2012/0185090 A1* | 7/2012 | Sanchez | ................ | B25J 11/0005 |
| | | | | 700/253 |
| 2015/0120043 A1* | 4/2015 | Howard | ................ | B25J 11/003 |
| | | | | 700/246 |
| 2016/0092018 A1* | 3/2016 | Lee | ................ | G06F 1/1643 |
| | | | | 345/173 |
| 2017/0206900 A1* | 7/2017 | Lee | ................ | G10L 15/22 |
| 2017/0305014 A1* | 10/2017 | Gildert | ................ | B25J 9/1664 |
| 2018/0247065 A1* | 8/2018 | Rhee | ................ | G06F 21/32 |
| 2018/0296875 A1* | 10/2018 | Christoforou | ......... | A61F 7/0053 |
| 2018/0302285 A1* | 10/2018 | Roman | ............... | H04L 41/0806 |
| 2019/0022870 A1* | 1/2019 | Miyazaki | ............. | B25J 11/0005 |
| 2019/0176331 A1* | 6/2019 | Ogawa | ................ | B25J 11/0005 |
| 2020/0241824 A1* | 7/2020 | Lee | ................ | G10L 15/22 |

FOREIGN PATENT DOCUMENTS

| | | |
|---|---|---|
| JP | 2014-502566 | 2/2014 |
| JP | 2016-093279 A | 5/2016 |
| JP | 2017-077442 A | 4/2017 |
| WO | 2012/097109 | 7/2012 |

OTHER PUBLICATIONS

Dance Central 2010, specifically Break it Down Mode (Year: 2010).*

An Automated Planning Model for HRI: Use Cases on Social Assistive Robotics (Year: 2020).*

The Extended European Search Report from the European Patent Office (EPO) dated Oct. 24, 2018 for the related European Patent Application No. 18183744.4.

* cited by examiner

FIG. 2

| RECOGNITION ITEM | SENSOR | CONDITION | INITIAL PARTICIPATION STAGE |
|---|---|---|---|
| PERSON RECOGNITION | CAMERA | RECOGNIZED | TASK EXECUTION |
| VOICE RECOGNITION | MICROPHONE | RECOGNIZED | |
| PERSON RECOGNITION | CAMERA | RECOGNIZED | IMITATION |
| VOICE RECOGNITION | MICROPHONE | NONE | |
| PERSON RECOGNITION | CAMERA | NONE | INQUIRY |
| VOICE RECOGNITION | MICROPHONE | RECOGNIZED | |
| PERSON RECOGNITION | CAMERA | NONE | N/A |
| VOICE RECOGNITION | MICROPHONE | NONE | |

FIG. 7

| PLACE / TIME ZONE | DINING ROOM | LIVING ROOM | ENTRANCE | BATHROOM | LAVATORY | OTHER |
|---|---|---|---|---|---|---|
| 7:00 – 9:00 | ON | OFF | OFF | OFF | OFF | OFF |
| 9:00 – 12:00 | OFF | OFF | OFF | OFF | OFF | OFF |
| 12:00 – 15:00 | OFF | OFF | OFF | OFF | OFF | OFF |
| 15:00 – 17:00 | OFF | ON | OFF | OFF | OFF | OFF |
| 17:00 – 19:00 | OFF | OFF | OFF | OFF | OFF | OFF |
| 19:00 – 21:00 | OFF | OFF | OFF | OFF | OFF | OFF |
| 21:00 – 7:00 | ON | ON | ON | ON | ON | ON |

T3

| | T4 | |
|---|---|---|
| REFUSAL TERM DICTIONARY | | |
| No | TERM | |
| 1 | GO AWAY | |
| 2 | DON'T TALK TO ME | |
| 3 | BE QUIET | |

APPARATUS, METHOD, NON-TRANSITORY COMPUTER-READABLE RECORDING MEDIUM STORING PROGRAM, AND ROBOT

BACKGROUND

1. Technical Field

The present disclosure relates to a robot and the like that communicate with a person.

2. Description of the Related Art

The main purpose of a robot known in the related art is to have a participation in a person through communication with the person. With this type of robot, it is important to continue a state in which the user is involved in the robot as much as possible.

Japanese Unexamined Patent Application Publication (Translation of PCT Application) No. 2014-502566 discloses a technology that includes an autonomous task state, in which a robot executes a task independent of the user's input, and a participation state, in which the robot interacts with the user; a timing at which to shift from the autonomous task state to the participation state and a timing at which to shift from the participation state to the autonomous task state are determined according to the current situation.

SUMMARY

However, the above conventional technology is problematic in that the participation state cannot be continued because infant properties that when the infant focuses on something, the infant fails to pay attention to the surrounding and that the infant is likely to get bored are not considered at all. The technology needs to be further improved.

In one general aspect, the techniques disclosed here feature an apparatus that communicates with a target person by executing a predetermined action, the apparatus comprising: a camera that captures an image around the apparatus; a microphone that acquires a sound around the apparatus; a processor; a speaker; and a driver that moves the apparatus. The processor causes the apparatus to execute any one of a first action, a second action, and a third action, which are executed for communication with the target person, according to the captured image and the captured sound, as an initial action, the second action being an action one-level higher than the third action, the first action being an action one-level higher than the second action. If there is a sound acquired by the microphone after the execution of the current action including the initial action, the processor causes the apparatus to execute an action one-level higher than the current action. If there is no sound acquired by the microphone after the execution of the current action, the processor decides whether the time elapsed from the execution of the current action is shorter than a threshold. If a decision is made that the elapsed time is shorter than the threshold, the processor causes the apparatus to continue the current action. If a decision is made that the elapsed time is equal to or longer than the threshold, the processor causes the apparatus to execute an action one-level lower than the current action. The processor causes the apparatus to execute a predetermined task as the first action. The processor causes the speaker to output a voice that talks to the target person as the second action. The processor controls the driver to cause the apparatus to move in synchronization with the motion of the target person as the third action.

These general and specific aspects may be implemented using a system, a method, and a computer program, and any combination of systems, methods, and computer programs.

The above aspect enabled a further improvement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates an example of an initial participation stage table;

FIG. 7 illustrates an example of an interrupt-disabled condition table;

DETAILED DESCRIPTION

Figure 1:
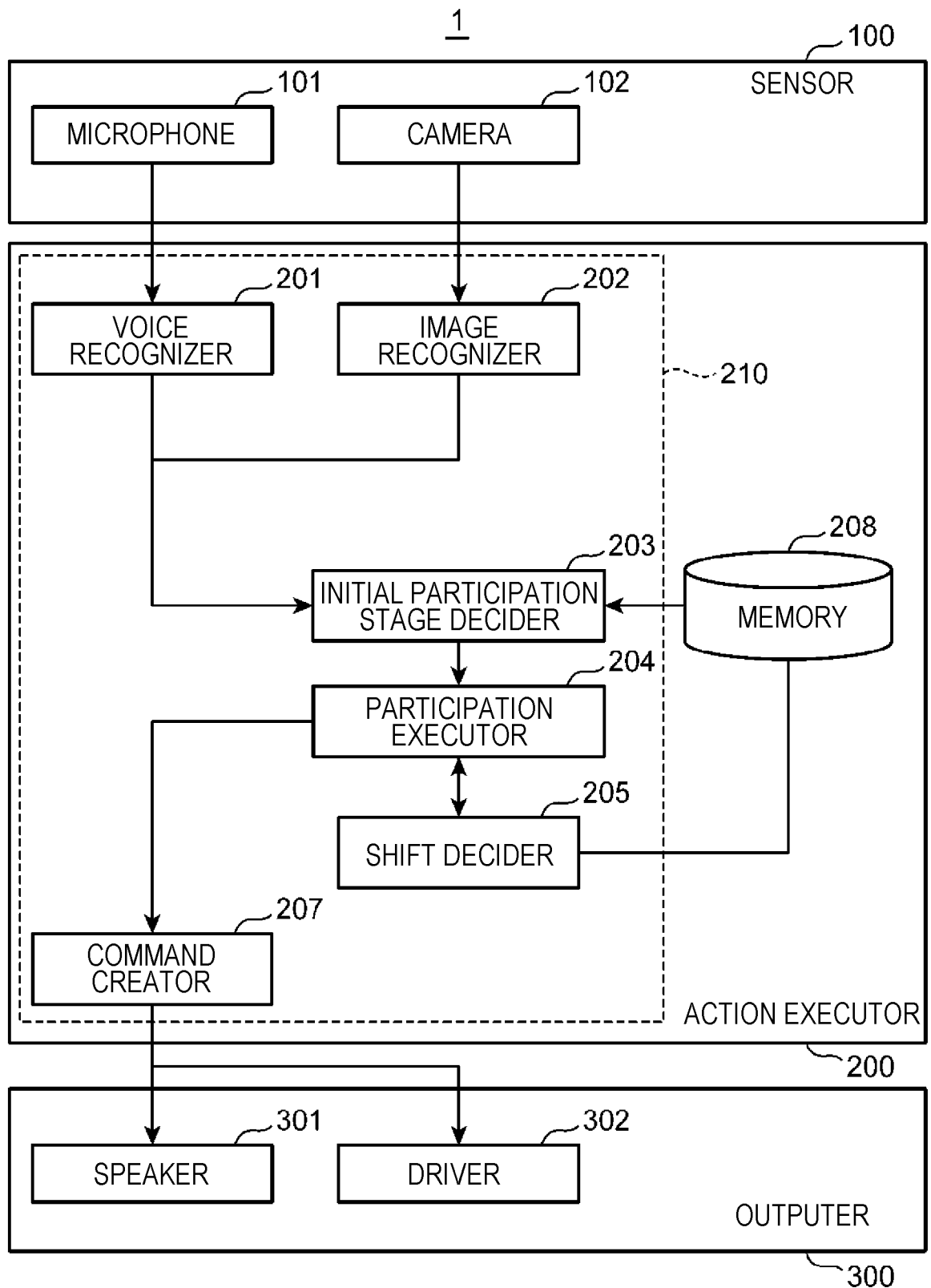
FIG. 1 is a block diagram illustrating an example of the entire structure of a robot according to an embodiment of the present disclosure.

Underlying Knowledge Forming Basis of the Present Disclosure

As described above, Japanese Unexamined Patent Application Publication (Translation of PCT Application) No. 2014-502566 discloses a method of determining a timing at which to make a shift between the participation state and a non-participation state, such as the autonomous task state or a rest state, other than the participation period. Specifically, Japanese Unexamined Patent Application Publication (Translation of PCT Application) No. 2014-502566 discloses that when the user gazes the robot and responds to a participation offer (such as, for example, an inquiry) from the robot, a shift is made from the non-participation state to the participation state. Japanese Unexamined Patent Application Publication (Translation of PCT Application) No. 2014-502566 also discloses that after a conversation fails to be established, if the user does not respond to a plurality of inquiries and a standby state continues for a predetermined time, a shift to the non-participation state is made.

The present inventor is also making research on a robot that helps improve the ability of the infant by educating and training the infant through some kind of task assigned to the infant; for example, the robot plays a quiz game with the infant, prompts the infant to clear up, and prompts the infant to learn. The infant has the psychological property that the infant is strongly self-centered. Although the infant has a strong sense of curiosity, the infant is likely to get bored and tends to be unable to continue concentration with ease.

Therefore, if the technology in Japanese Unexamined Patent Application Publication (Translation of PCT Application) No. 2014-502566 is intended for the infant, it is not possible to expect that the infant gazes at the robot and reliably responds to inquires from the robot, so a problem arises in that there are only a few chances to shift from the non-participation state to the participation state. Even if a shift to the participation state can be made, the infant highly tends to immediately become unresponsive to an inquiry from the robot, go far away from the robot, or take a similar action, so a problem arises in that the robot immediately returns to the non-participation state. As described above, Japanese Unexamined Patent Application Publication (Translation of PCT Application) No. 2014-502566 is problematic in that the participation state cannot be continued for a long time.

There is no reference to the above problem in Japanese Unexamined Patent Application Publication (Translation of PCT Application) No. 2014-502566, so the present inventor recognizes that the problem has not been tackled in the related art.

In view of this, the present inventor obtained a finding that when an infant is made to execute a task, it is counterproductive to assign a task suddenly in a state in which the consciousness of the infant is low and that it is effective to adequately enhance the consciousness of the infant before the assignment of the task. The present inventor obtained a finding that, to do so, it is effective to gradually enhance the infant's interest in the robot while increasing or decreasing the degree of the robot's participation in the infant.

To solve the above problem, the present inventor studied the following measures for improvement, under the above finding.

An apparatus according to one aspect of the present disclosure communicates with a target person by executing a predetermined action; the apparatus comprises:
  a camera that captures an image around the apparatus;
  a microphone that acquires a sound around the apparatus;
  a processor;
  a speaker; and
  a driver that moves the apparatus.

The processor
  causes the apparatus to execute any one of a first action, a second action, and a third action, which are executed for communication with the target person, according to the captured image and the captured sound, as an initial action, the second action being an action one-level higher than the third action, the first action being an action one-level higher than the second action,
  if there is a sound acquired by the microphone after the execution of the current action including the initial action, causes the apparatus to execute an action one-level higher than the current action,
  if there is no sound acquired by the microphone after the execution of the current action, decides whether the time elapsed from the execution of the current action is shorter than a threshold,
  if a decision is made that the elapsed time is shorter than the threshold, causes the apparatus to continue the current action,
  if a decision is made that the elapsed time is equal to or longer than the threshold, causes the apparatus to execute an action one-level lower than the current action,
  causes the apparatus to execute a predetermined task as the first action,
  causes the speaker to output a voice that talks to the target person as the second action, and
  controls the driver to cause the apparatus to move in synchronization with the motion of the target person as the third action.

In this aspect, the first action, second action, and third action are prepared, the degree of participation being highest in the first action, followed by the second action and third action in that order. First, any one of the first to third actions is determined as an initial action, according to the states of an image and sound around the robot. The first action is to cause the target person to execute a task, the second action is to talk to the target person, and third action is to synchronize with the motion of the target person. It can be said that the degree of participation in the target person is highest in the first action, followed by the second action and third action in that order.

If the microphone detects a surrounding sound, the initial action is shifted to a one-level higher action, assuming that the initial action is suitable to the target person and that the target person's interest in the apparatus is high. If no sound is detected by the microphone from when the initial action was executed until the elapsed time has reached the threshold, it is decided that the initial action is not suitable with respect to the consciousness of the target person and the interest of the target person has failed to be increased, in which case the initial action is shifted to a one-level lower action. After that, the current action is shifted step by step in this way and the interest of the target person is increased. In a state in which the interest of the infant has been adequately increased, a task is assigned to the target person.

As described above, in this aspect, after the target person's interest in the apparatus has been adequately increased, a task can be assigned to the target person. Therefore, even if the target person has a psychological property like, for example, an infant, it is possible for the apparatus to participate in the target person for a long time. As a result, it is possible to cause the target person to tackle the task for a long time and thereby effectively increase the ability of the target person.

In the above aspect, an action one-level lower than the third action may be a fourth action;
  an action one-level lower than the fourth action may be a fifth action; and
  the processor may
  cause the apparatus to execute the fifth action if there is a sound acquired by the microphone after the execution of the current action and the voice of the target person, the voice being included in the acquired sound, includes a phrase included in a dictionary provided in the apparatus,
  control the driver to cause the apparatus to perform a predetermined motion at the current position of the apparatus as the fourth action, and
  cause the apparatus to stop communication with the target person as the fifth action.

In this aspect, the fourth action and fifth action in which the degree of participation is lower than in the fourth action are further prepared, the fourth action causing the apparatus to perform a predetermined motion at the current position, the fifth action stopping communication with the target person. If the target person utters a phrase (such as "go away") included in the dictionary, the fifth action is executed. Therefore, in a situation in which the target person positively refuses communication with the apparatus and improvement in the interest in the apparatus cannot thereby be expected, it is possible to prevent the apparatus from unnecessarily stimulating the target person and the apparatus from becoming troublesome to the target person.

In the above aspect, if the processor recognizes the target person from the captured image and also recognizes the voice of the target person from the acquired sound, the processor may cause the apparatus to execute the first action as the initial action.

In this aspect, if, for example, the target person is uttering while facing the bottom of the apparatus, the first action is executed, assuming that the interest of the target person is adequately high. Therefore, it is possible to quickly assign a task to the target person.

In the above aspect, if the processor does not recognize the target person from the captured image and recognizes the voice of the target person from the acquired sound, the processor may cause the apparatus to execute the second action as the initial action.

In this aspect, if, for example, the target person is uttering something without facing the apparatus, the second action, in which the apparatus talks to the target person, is executed. Therefore, it is possible to increase the interest of the target person by appropriately stimulating the target person.

In the above aspect, if the processor recognizes the target person from the captured image and does not recognize the voice of the target person from the acquired sound, the processor may cause the apparatus to execute the third action as the initial action.

In this aspect, if, for example, the target person is not facing the apparatus and is uttering nothing, the third action, in which the apparatus synchronizes itself with the motion of the target person, is executed. Therefore, it is possible to increase the interest of the target person by appropriately stimulating the target person.

In the above aspect, the processor may cause the speaker to output a voice that suggests the start of communication with the target person, as the first action.

In this aspect, when the first action is executed, a task can be requested through communication with the target person. Therefore, it is possible to request the target person to execute a task without making the target person feel uncomfortable.

In the above aspect, if the processor recognizes, from the acquired image, that the head of the target person is inclined, the processor may control the driver to cause the apparatus to incline the top of the apparatus in the same direction and at the same angle as the inclination of the head, as the third action.

In this aspect, when the third action is executed, the orientation of the apparatus is changed in synchronization with a change in the orientation of the head of the target person, it is possible to have the target person easily understand that the apparatus is operating in synchronization with the motion of the target person and thereby to increase the target person's interest in the apparatus.

In the above aspect, if the processor recognizes, from the acquired image, an operation matching a certain rhythm of the target person, the processor may control the driver to cause the apparatus to move according to the rhythm, as the third action.

In this aspect, when the third action is executed, the apparatus moves according to the rhythm of the motion of the target person. Therefore, it is possible to have the target person easily understand that the apparatus is operating in synchronization with the motion of the target person and thereby to increase the target person's interest in the apparatus.

In the above aspect, the processor may cause the speaker to output a voice including a name corresponding to the target person, as the second action.

In this aspect, when the second action is executed, the apparatus talks to the target person by using the name of the target person. Therefore, it is possible to increase the target person's interest in the apparatus.

In the above aspect, the processor may swing the apparatus to the right and left, as the fourth action.

In this aspect, when the fourth action is executed, the apparatus is swung to the right and left. In a situation in which the interest of the target person is not so high, therefore, it is possible to draw the target person's interest in the apparatus with relatively less stimulus.

In the above aspect, the processor may spin the apparatus with the direction of the force of gravity taken as an axis, as the fourth action.

In this aspect, when the fourth action is executed, the apparatus rotates on its axis at that position. In a situation in which the interest of the target person is not so high, therefore, it is possible to draw the target person's interest in the apparatus with relatively less stimulus.

In the above aspect, the processor may move the apparatus away from the target person, as the fifth action.

In this aspect, when the fifth action is executed, the apparatus moves away from the target person. In a situation in which improvement in the interest of the target person cannot be expected, therefore, it is possible to prevent the apparatus from unnecessarily stimulating the target person.

In the above aspect, the processor may turn the apparatus through 180 degrees with the direction of the force of gravity taken as an axis, as the fifth action.

In this aspect, the apparatus faces in a direction opposite to the direction in which the apparatus faces of the target person. In a situation in which improvement in the interest of the target person cannot be expected, therefore, it is possible to prevent the apparatus from unnecessarily stimulating the target person.

In the above aspect, if there is no sound acquired by the microphone after the execution of the current action with a predetermined interrupt-disable condition set in the apparatus, the processor may cause the apparatus to execute the fifth action; and the predetermined interrupt-disable condition may include a condition about a predetermined time zone and may also include a condition about the place of the target person.

The target person may have a custom of taking an action (such as, for example, taking a meal or sleeping), at a predetermined time in a predetermined place, in which the target person feels bothered if the robot participates in the target person. Then, if the robot participates in the infant at the predetermined time in the predetermined place, the life pattern of the infant is undesirably disturbed. In view of this, in this aspect, interrupt-disabled conditions are set. In a time zone and a place for which an interrupt-disabled condition is set, the robot is made to execute the fifth action, in which the robot cancels its participation in the target person. Thus, it is possible to prevent the robot from disturbing the life pattern of the target person.

The present disclosure can also be implemented as a computer program that causes a computer to execute characteristic steps included in this type of apparatus. It will be appreciated that this computer program can be distributed as a computer-readable non-transitory recording medium such as a compact disc-read-only memory (CD-ROM) or through a communication network such as the Internet.

Embodiments described below are just specific examples of the present disclosure. Numerals, shapes, constituent elements, steps, the sequence of these steps, and the like indicated in the embodiments below are just examples, and are not intended to restrict the present disclosure. Of the constituent elements in the embodiments below, constituent elements not described in independent claims, each of which indicates the topmost concept of the present disclosure, will be described as arbitrary constituent elements. Contents in all embodiments may be combined.

EMBODIMENTS

Entire Structure

Embodiments of the present disclosure will be described below. In the description below, the apparatus in the present disclosure will be applied to a robot, as an example.

FIG. 1 is a block diagram illustrating an example of the entire structure of a robot 1 according to an embodiment of the present disclosure. The main purpose of the robot 1 is to support the growth of an infant, who is a user having the psychological property that the infant is strongly self-centered, through communication with the user. Communication is not limited to direct communication in which the infant and the robot 1 have a conversation with each other; indirect communication is also included in which the robot 1 and infant dance together.

The robot 1 has a sensor 100, an action executor 200, and an outputer 300. The sensor 100 comprises a microphone 101 and a camera 102. The microphone 101 converts a sound around the robot 1 to a voice signal. The microphone 101 further converts the converted voice signal from analog to digital at a predetermined sampling rate to produce digital voice data, and outputs the data to a processor 210. The camera 102 captures an image around the robot 1 and acquires image data. The camera 102, which includes, for example, a charge-coupled device (CCD) or complementary metal-oxide-semiconductor (CMOS) image sensor, takes a picture around the robot 1 at a predetermined frame rate (60 frames per second, for example) and converts the picture to digital image data. The camera 102 may be a normal camera that takes a picture of an object in front of the robot 1 or may be an omnidirectional camera that takes a picture in all directions of the robot 1. The image data captured at the predetermined frame rate by the camera 102 is input to the processor 210 at a predetermined frame rate. The camera 102 may be a stereo camera or an infrared camera. In this case, image data captured by the camera 102 includes a distance component that indicates a distance to a surrounding object.

The action executor 200 has the processor 210 and a memory 208. The processor 210, which is, for example, an application-specific integrated circuit (ASIC) processor, a digital signal processor (DSP), or a central processing unit (CPU), has a voice recognizer 201, an image recognizer 202, an initial participation stage decider 203, a participation executor 204, a shift decider 205, and a command creator 207. The constituent elements included in the processor 210 may be implemented by having the processor 210 execute programs, stored in the memory 208, that causes a computer to function as the action executor 200, or may be implemented as specific hardware circuits. All constituent elements constituting the action executor 200 may be mounted in the same terminal. Alternatively, part or all of the constituent elements constituting the action executor 200 may be individually mounted in other terminals or servers that are mutually connected through optical fiber, a wireless network, public telephone lines, or any other network. In this case, the action executor 200 is implemented by communication with the other terminals or servers.

The voice recognizer 201 receives voice data entered from the microphone 101, executes predetermined voice recognition processing on the voice data, recognizes utterance of a user present around the robot 1 from the voice data, converts the recognized utterance to a character string, and creates utterance data. In the predetermined voice recognition processing, a hidden Markov model, a statistical method, dynamic time warping, or another known method can be used.

The voice recognizer 201 also compares the vocal print of the voice data received from the microphone 101 with the vocal prints of predetermined users, the vocal prints being stored in the memory 208, to identify the user who has uttered. The voice recognizer 201 then outputs, as voice recognition data, data that includes identification information about the identified user and the utterance data. The predetermined users include, for example, the infant at which the robot 1 targets education support and the family members of the infant. In the description below, the infant at which the robot 1 targets education support will be taken as an example of a target person.

The image recognizer 202 recognizes the user present around the robot 1 by applying face recognition processing on image data received from the camera 102. The image recognizer 202 then outputs identification information about the recognized user as image recognition data. The image recognizer 202 also detects the eye line of the user recognized in face recognition processing, the orientation of the face, an amount by which the user has moved, and the like, and outputs detection results as image recognition data. Image recognition processing includes, for example, processing to extract the feature value of the face of a person indicated in image data, processing to compare the extracted feature value with feature values, prestored in the memory 208, of predetermined users, and other processing.

The initial participation stage decider 203 determines an initial participation stage that indicates the participation stage of the robot 1 at an early time for the infant, according to the voice recognition data output from the voice recognizer 201 and to the image recognition data output from the image recognizer 202. FIG. 2 illustrates an example of an initial participation stage table T1 used by the initial participation stage decider 203 to determine an initial participation stage. The initial participation stage table T1 is prestored in the memory 208.

The initial participation stage table T1 is a database that indicates a plurality of initial participation stages and conditions associated with each initial participation stage. The initial participation stage table T1 has a recognition item field, a sensor field, a condition field, and an initial participation stage field.

In the initial participation stage field, three participation stages, "task execution", "imitation" and "inquiry", and N/A indicating that there is no participation stage, are indicated. The degree of participation of the robot 1 in the infant in "task execution" is highest, followed by "inquiry" and "imitation" in that order. The participation stage refers to an index used to determine an action to be taken when the robot 1 participates in the infant.

When the participation stage is "task execution", an action in which a predetermined task is assigned to the infant is executed by the robot 1 (this action is an example of a first action). The predetermined task refers to a job or challenge to be tackled by the infant. Examples of the predetermined task include a riddle game, clearing up, study, homework, the reading of a picture book to the infant by the robot 1, and assistance. The predetermined task is determined in advance by processor 210 before the initial participation stage is determined, according to at least one of the voice recognition data output from the voice recognizer 201 and the image recognition data output from the image recognizer 202. In other words, the processing to determine the initial participation stage is executed each time a new task is determined.

If, for example, utterance data includes a message uttered by the mother who promotes the infant to perform clearing up, "clearing up" is determined as the task. If the voice recognition data includes utterance data made by the mother to promote the infant to perform clearing up such as, for example, "OO, clear up", "clearing up" is determined as the predetermined task.

In the recognition item field, recognition items for the robot 1 are included in correspondence to each initial participation stage. In the example in FIG. 2, "person recognition" and "voice recognition" are included for all initial participation stages, as recognition items. "Person recognition" indicates that the robot 1 has recognized an infant from an image. "Voice recognition" indicates that the robot 1 has recognized an infant from a sound.

In sensor field, the types of sensors used to implement recognition indicated in the recognition item field are included. In the example in FIG. 2, at all initial participation stages, "camera" is indicated for "person recognition" and "microphone" is indicated for "voice recognition". That is, person recognition is executed by using image data captured by the camera 102 and voice recognition is executed by using voice data collected by the microphone 101.

In the condition field, conditions to determine an participation stage are included. For example, "task execution" is determined when "recognized" is set for both "person recognition" and "voice recognition", "imitation" is determined when "recognized" is set for "person recognition" and "none" (that is, non-recognition)" is set for voice recognition", and "inquiry" is determined when "none" is set for "person recognition" and "recognized" is set for "voice recognition". If "none" is set for both "person recognition" and "voice recognition", no initial participation stage is determined.

The initial participation stage is determined according to the idea that the higher the infant's interest in the robot 1 is, the more the degree of participation in the robot 1 is increased. The degree of the infant's interest in the robot 1 is highest in the situation in which the infant is making a conversation with the robot 1 while facing it, followed by a situation in which the infant is making a conversation with the robot 1 without facing it and a situation in which the infant is facing the robot 1 but is not making a conversation with it, in that order.

In the initial participation stage table T1, therefore, in a situation in which "recognized" is set for both "person recognition" and "voice recognition", assuming that the infant's interest in the robot 1 is highest, "task execution" is assigned, which is the participation stage at which the degree of the infant's interest in the robot 1 is highest. In the situation in which "none" is set for "person recognition" and "recognized" is set for "voice recognition", assuming that the degree of the infant's interest in the robot 1 is second highest, "inquiry" is assigned, which is the participation stage at which the degree of the infant's interest in the robot 1 is second highest. In the situation in which "recognized" is set for "person recognition" and "none" is set for "voice recognition", assuming that the degree of the infant's interest in the robot 1 is third highest, "imitation" is assigned, which is the participation stage at which the degree of the infant's interest in the robot 1 is third highest.

Referring again to FIG. 1, the participation executor 204 outputs, to the command creator 207, a request that asks the command creator 207 to output a command that causes the robot 1 to execute an action corresponding to the initial participation stage determined by the initial participation stage decider 203. When the shift decider 205, which will be described later, determines a shift of the participation stage, the participation executor 204 also outputs, to the command creator 207, a request that asks the command creator 207 to output a command that causes the robot 1 to execute an action corresponding to a participation stage to which a shift has been made.

Figure 3:
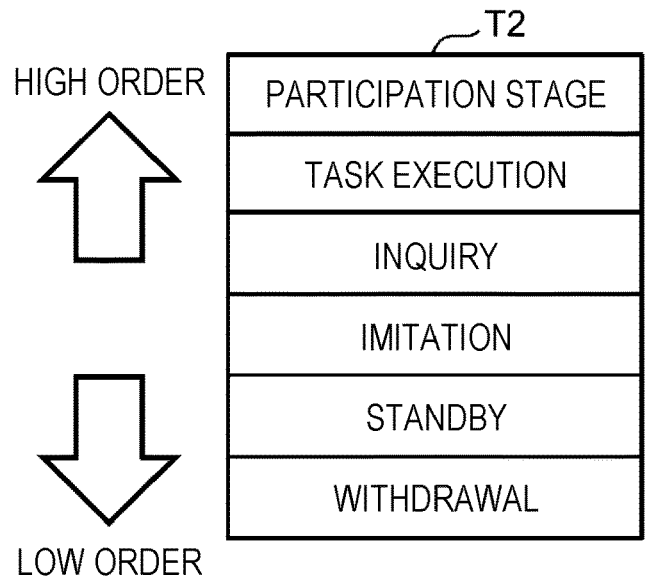
FIG. 3 illustrates an example of a shift table.

There are five participation stages, "task execution", "inquiry", "imitation", "standby" and "withdrawal", as illustrated in FIG. 3, which will be referenced later. Therefore, the participation executor 204 outputs, to the command creator 207, a request that asks the command creator 207 to output a command that causes the robot 1 to execute any of five actions corresponding to these five participation stages. An action corresponding to "task execution" is an example of the first action. An action corresponding to "inquiry" is an example of a second action. An action corresponding to "imitation" is an example of a third action. An action corresponding to "standby" is an example of a fourth action. An action corresponding to "withdrawal" is an example of a fifth action.

If the determined participation stage is, for example, "task execution", a request to output a command for task execution is output to the command creator 207. If the determined participation stage is, for example, "imitation", a request to output a command for imitation is output to the command creator 207.

The shift decider 205 decides whether to shift the initial participation stage determined by the initial participation stage decider 203 to another participation stage. The shift decider 205 also decides whether to shift the participation stage to which the initial participation stage has been shifted to another participation stage. In the description below, the participation stage that is currently set in the robot 1, which is the initial participation stage or a participation stage to which the initial participation stage has been shifted, will be referred to as the current participation stage.

After an action corresponding to the current participation stage has been executed, if voice of the infant is recognized by the voice recognizer 201, the shift decider 205 decides a shift from the current participation stage to a one-level higher participation stage. That is, as a result of the robot 1 having executed the current participation stage, if the infant responds through utterance, the shift decider 205 decides that the infant's interest in the robot 1 tends to increase and thereby shifts the current participation stage to a one-level higher participation stage.

If the voice recognizer 201 recognizes no voice of the infant after an action corresponding to the current participation stage has been executed (the action is the current action), the shift decider 205 decides whether the time elapsed from the execution of the current action is shorter than a threshold. If the shift decider 205 decides that the elapsed time is shorter than the threshold, the shift decider 205 decides to continue the current participation stage. If the elapsed time reaches or exceeds the threshold without the infant having uttered, the shift decider 205 decides that the current participation stage is shifted to a one-level lower participation stage. That is, if the infant does not respond through utterance while the shift decider 205 is waiting until the elapsed time reaches the threshold, the shift decider 205 decides that the current participation stage is not suitable to the infant and the infant's interest in the robot 1 thereby drops. Therefore, the shift decider 205 shifts the current participation stage to a one-level lower participation stage.

FIG. 3 illustrates an example of a shift table T2 in which the sequence of the participation stages of the robot 1 is determined. In the shift table T2 in FIG. 3, the five participation stages, "task execution", "inquiry", "imitation", "standby" and "withdrawal", are listed in that order, the order being descending order of the degree at which the robot 1 participates in the infant. For example, the shift decider 205 sets participation stages step by step in the order in which they are listed in the shift table T2 to raise or lower the degree of the participation of the robot 1 in the infant. The shift table T2 is prestored in the memory 208.

When the command creator 207 receives, from the participation executor 204, a request to output a command, the command creator 207 outputs a command indicated by the output request to the outputer 300.

The outputer 300 is a constituent element that causes the robot 1 to execute an action corresponding to the current participation stage, in response to the command from the command creator 207. The outputer 300 has a speaker 301 and a driver 302.

The speaker 301 converts voice data needed to execute an action corresponding to the current participation stage to voice and outputs the converted voice to the outside, in response to the command from the command creator 207.

The driver 302 comprises, for example, an actuator such as a motor and a mechanism operated by the actuator. The driver 302 causes the robot 1 to execute an action corresponding to the current participation stage, in response to the command from the command creator 207. The mechanism includes a member that advances or retracts the robot 1, a member that changes the orientation of the robot 1, and a member that changes the orientation of a display that displays the expression of the face of the robot 1. The actuator includes a motor that drives the member that advances or retracts the robot 1, a motor that drives the member that changes the orientation of the robot 1, and a motor that changes the orientation of the display.

If the action executor 200 is mounted in a separate terminal or server from the main body of the robot 1, the speaker 301 and driver 302 only need to be connected to the terminal or server in which the action executor 200 is mounted, in a wired or wireless manner.

Flowchart

Figure 4:
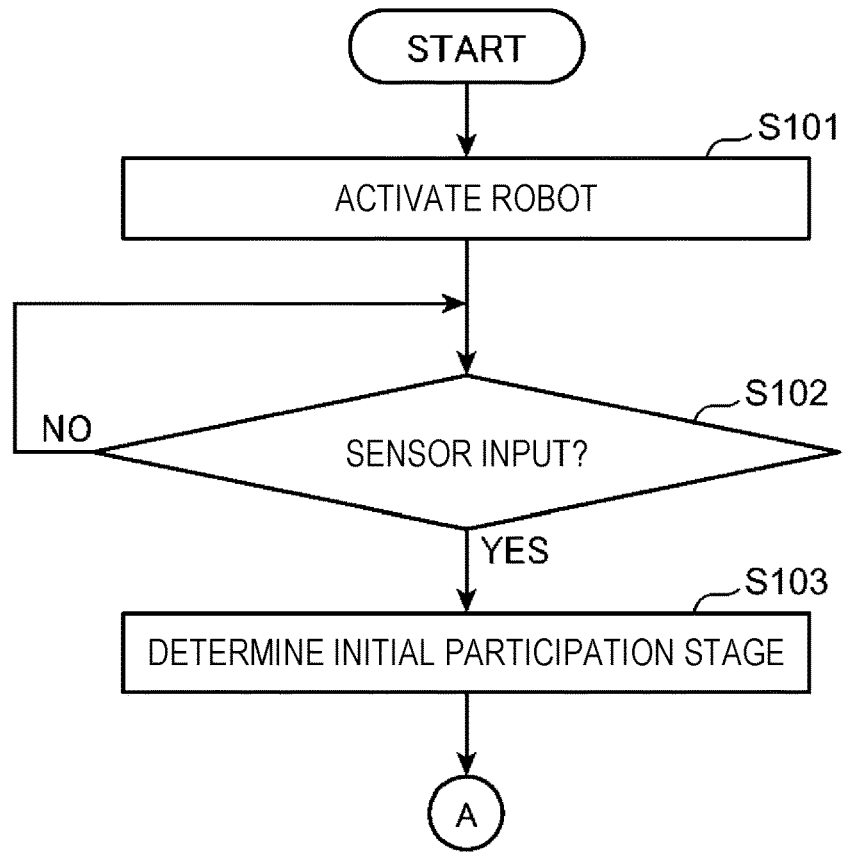
FIG. 4 is a flowchart illustrating an example of processing to determine a participation stage.
Figure 5:
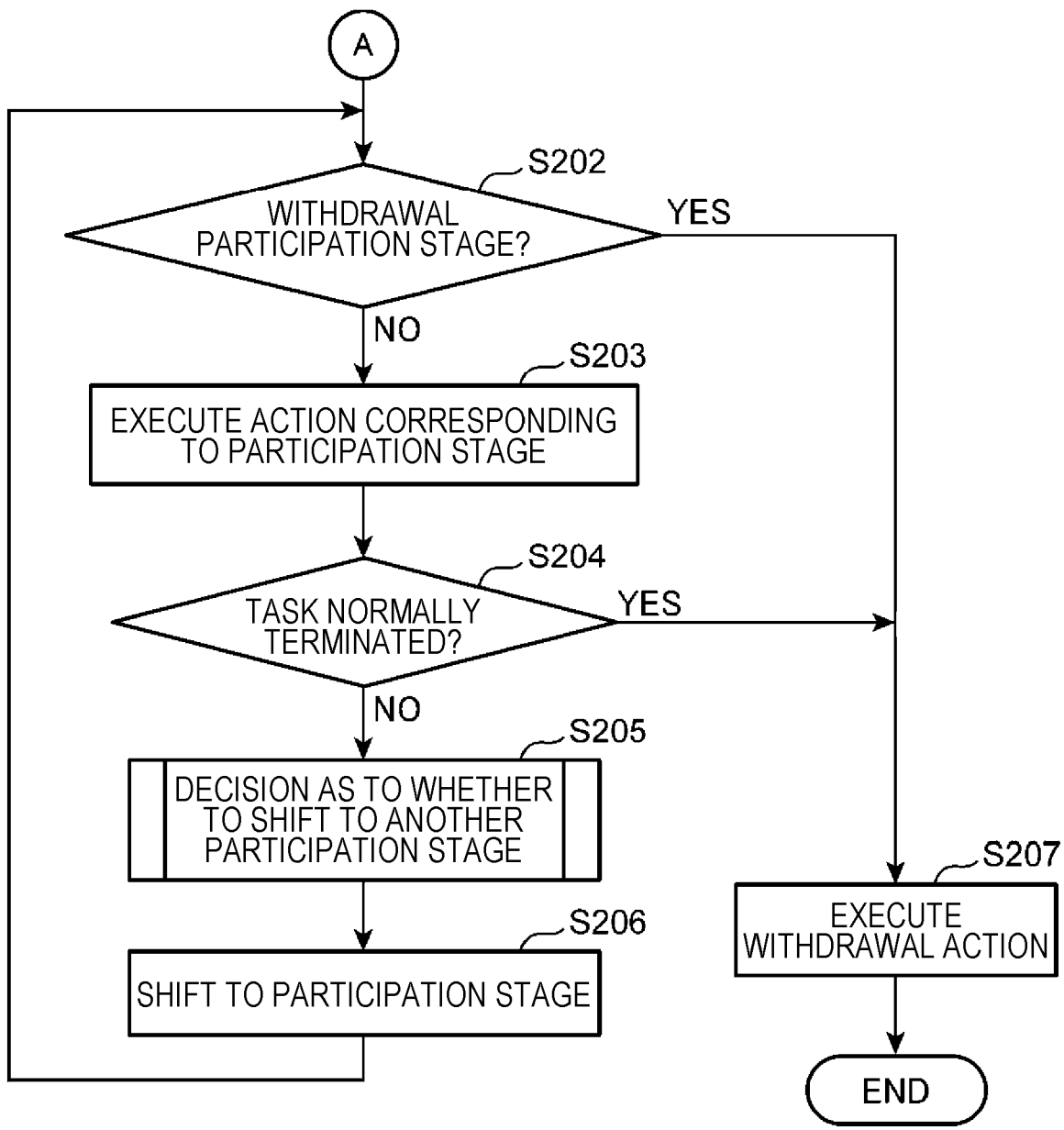
FIG. 5 is a flowchart following the flowchart in FIG. 4.

Next, processing to determine a participation stage of the robot 1 will be described with reference to FIGS. 4 and 5. FIG. 4 is a flowchart illustrating an example of processing to determine a participation stage. FIG. 5 is a flowchart following the flowchart in FIG. 4.

First, when the voice recognizer 201 is powered on, the processor 210 activates the robot 1 (S101). Next, the initial participation stage decider 203 decides whether there is an sensor input, according to voice recognition data output from the voice recognizer 201 and image recognition data output from the image recognizer 202 (S102). If voice recognition data related to the infant is not output from the voice recognizer 201 and image recognition data related to the infant is not output from the image recognizer 202, the initial participation stage decider 203 can decide that there is no sensor input. If at least one of voice recognition data related to the infant and image recognition data related to the infant is output, the initial participation stage decider 203 can decide that there is a sensor input.

If, in S102, the initial participation stage decider 203 decides that there is a sensor input (the result in S102 is Yes), processing proceeds to S103. If the initial participation stage decider 203 decides that there is no sensor input (the result in S102 is No), processing returns to S102.

In S103, the initial participation stage decider 203 determines the initial participation stage of the robot 1 with reference to the initial participation stage table T1 stored in the memory 208 (S103). Specifically, the initial participation stage decider 203 determines, as the initial participation stage of the robot 1, the participation stage that matches items in the condition field.

If, for example, utterance by the infant is voice-recognized by the voice recognizer 201 and an image of the infant is recognized by the image recognizer 202, "task execution" is determined as the initial participation stage. If, for example, utterance by the infant is not voice-recognized by the voice recognizer 201 and an image of the infant is recognized by the image recognizer 202, "imitation" is determined as the initial participation stage. If, for example, utterance by the infant is voice-recognized by the voice recognizer 201 and an image of the infant is not recognized by the image recognizer 202, "inquiry" is determined as the initial participation stage.

Referring to FIG. 5, if the current participation stage is not "withdrawal" in S202 (the result in S202 is No), the participation executor 204 outputs, to the command creator 207, a request to output a command to execute an action corresponding to the current participation stage (S203). Since three participation stages, "task execution", "inquiry" and "imitation", are available as the initial participation stage, an action corresponding to any one of the three participation stage is first executed.

If a riddle game, for example, is executed as a task, the processor 210 is required to output, to the outputer 300, a command to output a voice from the speaker 301, the voice suggesting the start of communication, such as "Let's play a riddle game", for the infant and to output, to the outputer 300, a command to output a voice that reads aloud a riddle problem from the speaker 301. After the riddle problem has been read aloud, if utterance of a response from the infant is voice-recognized by the voice recognizer 201, the processor 210 compares the utterance with the answer of the riddle problem. If the utterance is correct, the processor 210 is required to output, to the outputer 300, a command to output a voice indicating that the response is correct from the speaker 301.

If clearing up is executed as a task, the processor 210 outputs, to the outputer 300, a command to output an inquiry voice indicating "Let's clear up" from the speaker 301, after which the processor 210 decides, from a recognition result obtained from the image recognizer 202, whether the infant is clearing up. If the processor 210 decides that the infant is clearing up, the processor 210 is required to output, to the outputer 300, a command to output a voice that praises the infant for the infant's action from the speaker 301. If f the processor 210 decides that the infant is not clearing up, the processor 210 is required to output, to the outputer 300, a command to prompt the infant to clear up from the speaker 301.

An example of an action corresponding to the inquiry participation stage is for the robot 1 to talk to the infant by, for example, calling the name of the infant.

As an action corresponding to the imitation participation stage, an action is applicable in which the robot 1 moves in synchronization with the infant, that is, an action to imitate the motion of the infant is applicable. When the robot 1 executes an action corresponding to the imitation participation stage, if the processor 210 detects, from the recognition result obtained from the image recognizer 202, that, for example, the infant is facing down and is concentrating on some work, the processor 210 is required to output, to the outputer 300, a command to cause the top of the robot 1 to incline through the same angle as the inclination of the head of the infant and in the same orientation as the orientation of the head. When referring to the same orientation in this embodiment, it is assumed that the robot 1 and infant face each other. Therefore, if the infant turns the head to the left, the robot 1 turns its top to the right; if the infant turns the head to the right, the robot 1 turns its top to the left.

If the processor 210 detects, from the recognition result obtained from the image recognizer 202, that the infant is acting according to a certain rhythm, just like dancing, the processor 210 is required to output, to the outputer 300, a command to cause the robot 1 to dance according to the certain rhythm.

If, in S202, the current participation stage is "withdrawal" (the result in S202 is Yes), the participation executor 204 outputs, to the command creator 207, a request to output a command to cause the robot 1 to execute a withdrawal action in which the robot 1 cancels its participation in the infant, and has the robot 1 execute a withdrawal action (S207) terminating the processing.

The withdrawal action refers to an action in which the robot 1 cancels its participation in the infant. An autonomous action in which the robot 1 stops communication with the infant is applicable as the withdrawal action. Examples of the withdrawal action are to move the robot 1 to a position away from the infant by a predetermined distance and to change the orientation of the robot 1 through 180 degrees so that the front of the robot 1 faces in a direction opposite to the direction in which the robot 1 faces the front of the infant. Thus, in a state in which the consciousness of the infant is too low to expect improvement in interest in the robot 1, it is possible to prevent the infant from having a disgust for the robot 1 by being stimulated more than necessary.

If, in S204, the current participation stage is "task execution" and the task has been terminated (the result in S204 is Yes), the participation executor 204 outputs, to the command creator 207, a request to output a command to cause the robot 1 to execute the withdrawal action, and has the robot 1 execute the withdrawal action (S207), terminating the processing. Thus, it is possible to prevent the robot 1 having a disgust for the robot 1 by being pursued by the robot 1 in spite of the task having been terminated.

If the current participation stage is "task execution" and the task has not been terminated (the result in S204 is No) or the current participation stage is "inquiry", "imitation", or "standby" (the result in S204 is No), the shift decider 205 performs processing to decide whether to shift to another participation stage (S205).

A task is terminated if a termination condition set for the task is satisfied. In a task to respond to questions from the infant, for example, after the robot 1 has responded to a question from the infant, if there is no another question from the infant within a predetermined time, the task is terminated. In a task to play a riddle game, if the infant has responded to the riddle offered by the robot 1 a predetermined number of times or the infant has not uttered within a predetermined time after the offer of the riddle, the task is terminated.

Next, the participation executor 204 outputs, to the command creator 207, a request to output a command to cause the robot 1 to execute the action corresponding to the participation stage determined in processing in S205 (S206). Thus, the action corresponding to the participation stage determined in processing in S205 is executed by the robot 1.

The participation stage determined in processing in S205 is temporarily stored in the memory 208.

Figure 6:
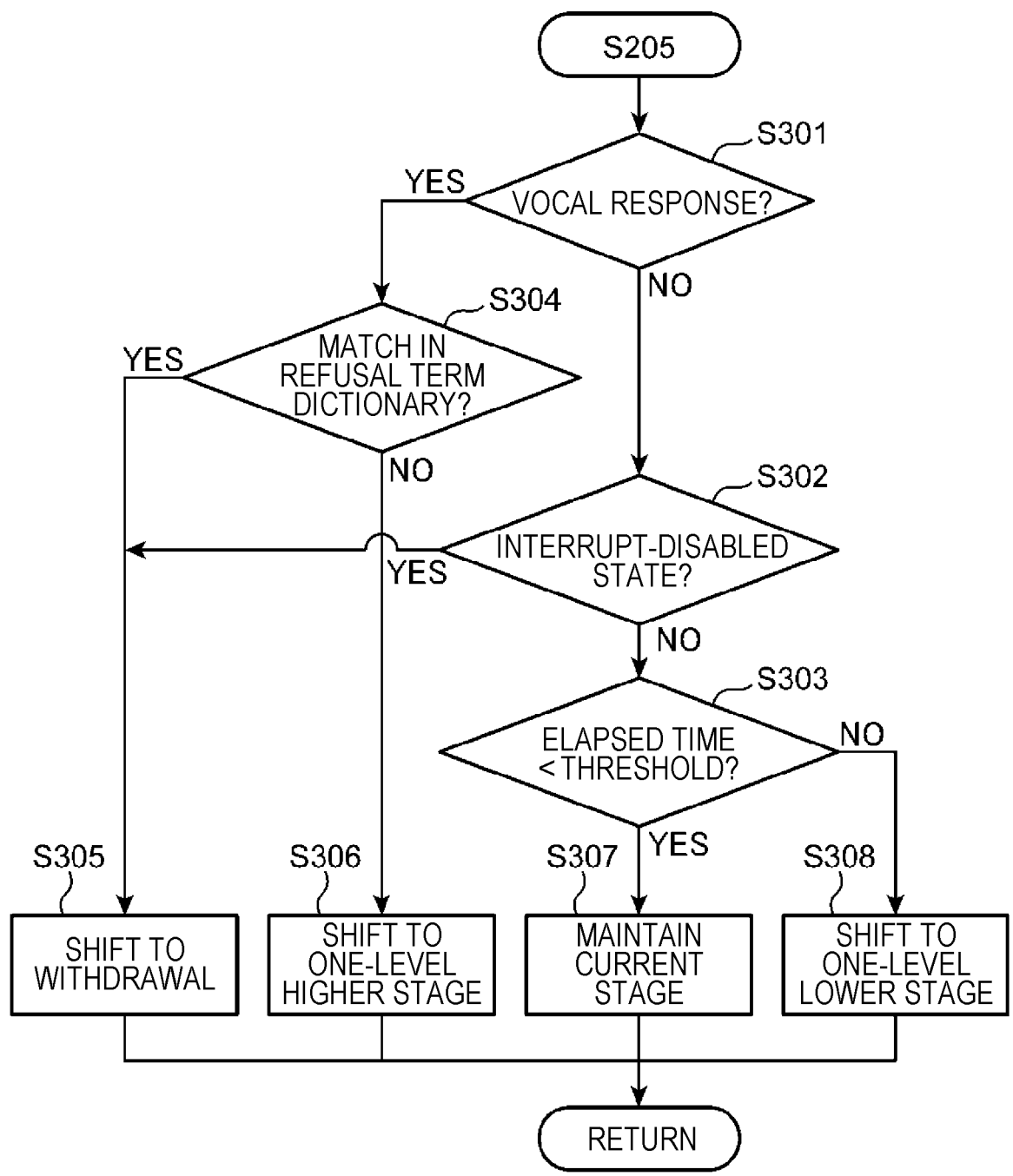
FIG. 6 is a flowchart illustrating details of processing in S205 in FIG. 5.

Next, processing, indicated in S205 in FIG. 5, to decide whether to shift to another participation stage will be described. FIG. 6 is a flowchart illustrating details of processing in S205 in FIG. 5.

First, if the shift decider 205 decides that there is no vocal response from the infant (the result in S301 is No), the shift decider 205 decides whether an interrupt-disabled state is in progress (S302). FIG. 7 illustrates an example of an interrupt-disabled condition table T3 in which interrupt-disabled conditions are set.

The infant may have a custom of taking an action in which the infant feels bothered if the robot 1 participates in the infant, the action being taken at a predetermined time in a predetermined place. Then, if the robot 1 participates in the infant at the predetermined time in the predetermined place, the life pattern of the infant is disturbed. If, for example, the infant has a custom of having a breakfast in a dining room at a time zone in the morning, when the robot 1 participates in the infant in this time zone in the morning, the breakfast is disturbed. In view of this, in this embodiment, interrupt-disabled conditions are set. In a time zone and a place for which an interrupt-disabled condition is set, the robot 1 is made to execute a withdrawal action to prevent the robot 1 from disturbing the life pattern of the infant.

The interrupt-disabled condition table T3 is a two-dimensional table in which time zones are vertically stipulated and places are horizontally stipulated. In the time zone field, a plurality of time zones into which the length of one day is divided are indicated. In the interrupt-disabled condition table T3, the length of one day is divided into seven time zones, 7:00 to 9:00, 9:00 to 12:00, . . . , and 21:00 to 7:00. In the place field, the names of rooms in the home of the infant are indicated. In each cell in the interrupt-disabled condition table T3, ON or OFF is indicated; ON indicates that an interrupt-disabled condition is set, and OFF indicates that no interrupt-disabled condition is set.

In the time zone from 7:00 to 9:00, for example, ON is set in the "dining room" cell. Therefore, if the shift decider 205 detects that the infant is in the dining room in this time zone, the shift decider 205 determines "withdrawal" as the participation stage. This is because since, in this home, it is a custom that the infant has a breakfast in the dining room in, for example, the time zone of 7:00 to 9:00, the participation of the robot 1 in the infant disturbs the breakfast.

In the time zone of 7:00 to 9:00, however, OFF is indicated in the cells indicating places other than the dining room. Even in this time zone, therefore, if the shift decider 205 detects that the infant is in a place other than the dining room, the robot 1 performs a normal action in which an action other than a withdrawal action is permitted.

Interrupt-disabled conditions are set in advance according to data entered by the user into, for example, a mobile terminal such as a smartphone. The user can set interrupt-disabled conditions in, for example, a mobile terminal by uttering to the mobile terminal. Thus, in an interrupt-disabled state, it is possible to prevent the robot 1 from participating in the infant.

Referring again to FIG. 6, the shift decider 205 references the interrupt-disabled condition table T3 in S302. If the shift decider 205 decides that an interrupt-disabled state is in progress (the result in S302 is Yes), the shift decider 205 shifts the participation stage to "withdrawal" (S305). If the shift decider 205 decides that an interrupt-disabled state is not in progress (the result in S302 is No), processing proceeds to S303. In the decision as to whether an interrupt-disabled state is in progress, the shift decider 205 determines, from the recognition result from the image recognizer 202, a room in which the infant is present. If ON is set in the cell corresponding to the determined room and the time zone in which the current time is included, the shift decider 205 decides that an interrupt-disabled state is in progress (the result in S302 is Yes). If OFF is set in the cell, the shift decider 205 decides that an interrupt-disabled state is not in progress (the result in S302 is No).

In S303, the shift decider 205 decides whether the time elapsed from the start of the action corresponding to the current participation stage is shorter than a threshold. If the elapsed time is shorter than the threshold (the result in S303 is Yes), the shift decider 205 maintains the current participation stage (S307). If the elapsed time is equal to or longer than the threshold (the result in S303 is No), the shift decider 205 shifts the current participation stage to a one-level lower participation stage with reference to the shift table T2 (S308). As the threshold, a preset time is used that is enough to predict that even if the robot 1 is made to execute the action corresponding to the same participation stage any longer, the interest of the infant is not increased. For example, one minute, two minutes, three minutes, five minutes, ten minutes, and so on can be used as the threshold.

If, in FIG. 3, the current participation stage is, for example, "imitation" and a decision is made in this state so as to shift the participation stage to a one-level lower participation stage, the participation stage is set to "standby". An action applicable as the action corresponding to the standby participation stage is to swing the robot 1 to the right and left at that position or to spin the robot 1 at that position with the direction of the force of gravity taken as an axis. In a situation in which the interest of the infant is low, therefore, it is possible to draw the infant's interest in the robot 1 with relatively less stimulus.

Figures 8, 9:
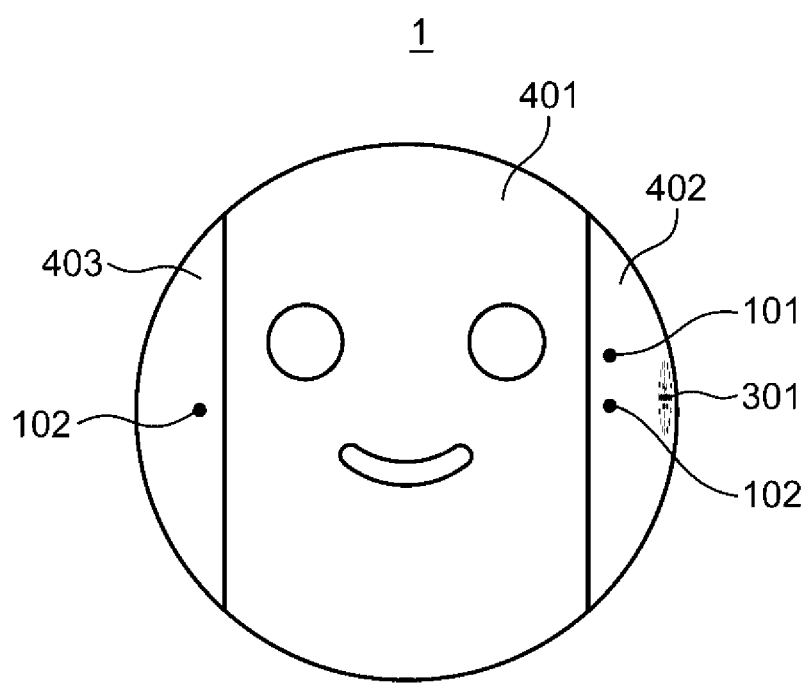
FIG. 8 illustrates an example of a dictionary table.
FIG. 9 illustrates an example of the appearance of a robot.

If, in S301, the shift decider 205 decides that there is a vocal response from the infant (the result in S301 is Yes), the shift decider 205 decides whether there is a match with utterance of the infant in a refusal term dictionary (S304). FIG. 8 illustrates an example of a dictionary table T4 in which a refusal term dictionary is included. The dictionary table T4 includes "go away", "don't talk to me", "be quiet", and other terms that refuse the robot 1. If utterance of the infant includes any term listed in the dictionary table T4 (the result in S304 is Yes), the shift decider 205 decides that the infant positively refuses the participation of the robot 1 in the infant and thereby shifts the current participation stage to "withdrawal" (S305).

If utterance of the infant does not include any term listed in the dictionary table T4 (the result in S304 is No), the shift decider 205 shifts the current participation stage to a one-level higher participation stage (S306). Referring to FIG. 3, if the current participation stage is, for example, "imitation" and a decision is made in this state so as to shift the participation stage to a one-level higher participation stage, the participation stage is set to "inquiry".

Upon the completion of processing in S305, S306, S307, and S308, processing returns to S206 in FIG. 5, in which the participation stage is shifted, after which processing returns to S202 in FIG. 5 and processing in S202 to S206 is repeated until the task is terminated or a withdrawal action is executed.

Robot

Next, the mechanism of the robot 1 will be described. FIG. 9 illustrates an example of the appearance of the robot 1. The robot 1 has a main cabinet 401 in a spherical zone shape and spherical crowns 402 and 403. The main cabinet 401 and spherical crowns 402 and 403 constitute a spherical body as a whole. That is, the robot 1 has a spherical shape. The robot 1 also has the microphone 101, camera 102, and speaker 301 in the spherical crown 402 (or spherical crown 403). The robot 1 also has a control circuit (not illustrated). The action executor 200 illustrated in FIG. 1 is mounted on this control circuit. In the example in FIG. 9, the camera 102 is a stereo camera including two cameras mounted in the spherical crown 402 and spherical crown 403, one for each spherical crown. The camera 102 captures an image in a surrounding environment and distance data.

The center of the spherical crown 402 and the center of the spherical crown 403 are permanently connected with a shaft (not illustrated) provided in the main cabinet 401. The main cabinet 401 is rotatably attached to the shaft. A frame (not illustrated) and a display (not illustrated) are also attached to the shaft. A first motor (not illustrated) that rotates the main cabinet 401 is attached to the frame. When this first motor (not illustrated) rotates, the main cabinet 401 rotates with respect to the spherical crowns 402 and 403, causing the robot 1 to advance or retract. When the robot 1 advances or retracts, the spherical crowns 402 and 403 are in a halt state, so the speaker 301 and camera 102 remain in a state in which they face in the forward direction of the robot 1. The display displays the eyes and mouth of the robot 1. The display is attached so that its angle with respect to the shaft can be adjusted with the power of a second motor (not illustrated). When the angle of the display with respect to the shaft is adjusted, therefore, the orientations of the eyes and mouth of the robot 1 are adjusted. Since the display is attached to the shaft independently of the main cabinet 401, even if the main cabinet 401 rotates, the angle of the display with respect to the shaft remains unchanged. This enables the robot 1 to advance or retract with the orientations of the eyes and mouth fixed.

In addition, a weight (not illustrated) is suspended from the shaft. This weight is attached so as to be swingable by the power of a third motor (not illustrated) with the forward direction of the robot 1 taken as an axis. When the weight is swung, therefore, the robot 1 can be made to operate so as to swing at that position. When the robot 1 is made to advance in a state in which the weight is inclined to the left or right when viewed from the rear side toward the front side, the robot 1 can be turned to the left or right. When, for example, an operation to advance the robot 1 with the weight inclined to the left and an operation to retract the robot 1 with the weight inclined to the right are repeated at short intervals, the robot 1 can turn with the direction of the force of gravity taken as an axis (this turn is a spin turn).

The main cabinet 401, first motor, second motor, third motor, and display described above constitute the driver 302 illustrated in FIG. 1.

The control circuit controls the operations of the robot 1. Although the whole of the robot 1 is a spherical body, this is not a limitation; the robot 1 only needs to be structured so as to have at least a moving mechanism.

As described above, in this embodiment, the degree of the participation of the robot 1 in the infant is increased step by step to gradually increase the infant's interest in the robot 1. In a state in which the interest of the infant has been adequately increased, a task can be assigned to the infant. In the present disclosure, therefore, it is possible for the robot 1 to participate, for a long time, in an infant having the psychological property that makes it difficult for the infant to continue concentration. As a result, it is possible to cause the infant to tackle the task for a long time and thereby effectively increase the ability of the infant.

The present disclosure can use variations described below.

(1) Although, in the above embodiment, an example has been described in which the apparatus according to the present disclosure is applied to the robot 1, this is not a limitation; any implementation may be allowed if a movable apparatus other than the robot 1 is used.

(2) Although, in the above embodiment, "withdrawal" and "standby" have been included as participation stages, these participation stages may be omitted. In this case, the robot 1 takes an action corresponding to any one of three participation stages, "task execution", "inquiry" and "imitation".

(3) Although, in the flowchart in FIG. 6, processing to decide whether an interrupt-disabled state is in progress is executed in S302 and processing to decide whether there is a match in the refusal term dictionary is executed in S304, this is just an example; either or both of the two pieces of processing may be omitted.

(4) Although the start of the flowchart in FIG. 5 is triggered by a power-on event, this is just an example; the start of the flowchart may be triggered by the occurrence of a task to be assigned to the infant.

The robot according to the present disclosure can maintain a state in which the robot participates in a target person who is likely to get bored and thereby makes it difficult for the robot to determine a timing at which to participate in the target person. Therefore, the robot according to the present disclosure is useful as an education robot.

What is claimed is:

1. An apparatus that communicates with a target person by executing a predetermined action, the apparatus comprising:
    a camera that captures images around the apparatus;
    a microphone that acquires sounds around the apparatus;
    a processor;
    a speaker; and
    a driver that moves the apparatus; wherein
    the processor:
        causes the apparatus to execute a withdrawal action, in which a third action is not executed as an initial action, according to at least one of a first captured image or an acquired sound when the at least one of the first captured image or the acquired sound is at least one of captured or acquired during a predetermined time and in a predetermined place;
        causes the apparatus to execute the third action as the initial action, the initial action being executed for communication with the target person according to the at least one of the first captured image or the acquired sound when the withdrawal action is not executed, a second action being one-level higher than the third action, a first action being one-level higher than the second action;
        when a first sound is acquired by the microphone after an execution of the initial action, causes the apparatus to execute the second action one-level higher than the third action;
        when a second sound is acquired by the microphone after an execution of the second action, causes the apparatus to execute the first action one-level higher than the second action, the first action including the apparatus requesting the target person to execute a predetermined task;
        when the processor decides, based on a second captured image, that the target person is not executing the predetermined task after the execution of the first action, again causing the apparatus to execute the first action;
        when no sound is acquired by the microphone after the execution of the second action, determines whether a time elapsed from the execution of the second action is shorter than a threshold;
        when the time is shorter than the threshold, causes the apparatus to continue the second action; and
        when the time is equal to or longer than the threshold, causes the apparatus to execute the third action one-level lower than the second action,
    the second action includes the speaker outputting a voice that talks to the target person, and
    the third action includes the driver causing the apparatus to move in synchronization with a motion of the target person.

2. The apparatus according to claim 1, wherein
    an action one-level lower than the third action is a fourth action,
    an action one-level lower than the fourth action is a fifth action, the processor causes the apparatus to execute the fifth action when a third sound is acquired by the microphone after the execution of at least one of the third action or the second action, the third sound including a voice of the target person and the voice including a phrase included in a dictionary provided in the apparatus,
    the fourth action includes the driver causing the apparatus to perform a predetermined motion at a current position of the apparatus, and
    the fifth action includes the apparatus stopping communication with the target person.

3. The apparatus according to claim 2, wherein the fourth action includes the apparatus swinging rightward and leftward.

4. The apparatus according to claim 2, wherein the fourth action includes the apparatus spinning with a direction of a force of gravity taken as an axis.

5. The apparatus according to claim 2, wherein the fifth action includes the apparatus moving away from the target person.

6. The apparatus according to claim 2, wherein the fifth action includes the apparatus turning 180 degrees with a direction of a force of gravity taken as an axis.

7. The apparatus according to claim 2, wherein
    when no sound is acquired by the microphone after the execution of at least one of the third action or the second action and a predetermined interrupt-disable condition is set in the apparatus, the processor causes the apparatus to execute the fifth action, and
    the predetermined interrupt-disable condition includes a condition about a predetermined time zone and a condition about a place of the target person.

8. The apparatus according to claim 1, wherein
    the processor causes the apparatus to execute the third action as the initial action when the withdrawal action is not executed and when an image of the target person is recognized from the captured image and a voice of the target person is not recognized from the acquired sounds, and
    when the processor recognizes the image of the target person from the captured image and also recognizes the voice of the target person from the acquired sounds, the processor causes the apparatus to execute the first action.

9. The apparatus according to claim 8, wherein the first action includes the speaker outputting a second voice that indicates a start of communication with the target person.

10. The apparatus according to claim 1, wherein
the processor causes the apparatus to execute the third action as the initial action when the withdrawal action is not executed and when an image of the target person is recognized from the captured image and a voice of the target person is not recognized from the acquired sounds, and
when the processor does not recognize the image of the target person from the captured image and recognizes the voice of the target person from the acquired sounds, the processor causes the apparatus to execute the second action.

11. The apparatus according to claim 10, wherein the second action includes the speaker outputting the voice including a name corresponding to the target person.

12. The apparatus according to claim 1, wherein, when the processor recognizes the target person from the captured image and does not recognize a voice of the target person from the acquired sounds, the processor causes the apparatus to execute the third action as the initial action.

13. The apparatus according to claim 12, wherein, when the processor recognizes, from the first captured image, that a head of the target person is inclined, the processor controls the driver to cause the apparatus to incline a top of the apparatus in a same direction and at a same angle as an inclination of the head as the third action.

14. The apparatus according to claim 12, wherein, when the processor recognizes, from the first captured image, an operation matching a rhythm of the target person, the processor controls the driver to cause the apparatus to move according to the rhythm as the third action.

15. A method performed by an apparatus that communicates with a target person by executing a predetermined action, the method comprising:
capturing images around the apparatus by a camera;
acquiring sounds around the apparatus by a microphone;
causing the apparatus to execute a withdrawal action, in which a third action is not executed as an initial action, according to at least one of a first captured image or an acquired sound when the at least one of the first captured image or the acquired sound is at least one of captured or acquired during a predetermined time and in a predetermined place;
causing the apparatus to execute the third action as the initial action, the initial action being executed for communication with the target person according to the at least one of the first captured image or the acquired sound when the withdrawal action is not executed, a second action being one-level higher than the third action, a first action being one-level higher than the second action;
causing, when a first sound is acquired by the microphone after an execution of the initial action, the apparatus to execute the second action one-level higher than the third action;
causing, when a second sound is acquired by the microphone after an execution of the second action, the apparatus to execute the first action one-level higher than the second action, the first action including the apparatus requesting the target person to execute a predetermined task;
causing, based on a second captured image and when the target person is not executing the predetermined task after the execution of the first action, the apparatus to again execute the first action;

determining, when no sound is acquired by the microphone after the execution of the second action, whether a time elapsed from the execution of the second action is shorter than a threshold;
causing, when the time is shorter than the threshold, the apparatus to continue the second action; and
causing, when the time is equal to or longer than the threshold, the apparatus to execute the third action one-level lower than the second action;
the second action includes the speaker outputting a voice that talks to the target person, and
the third action includes the driver causing the apparatus to move in synchronization with a motion of the target person.

16. A non-transitory computer-readable recording medium storing a program that causes the apparatus to execute the method according to claim 15.

17. A system that communicates with a target person by executing a predetermined action, the system comprising:
a camera that captures images around a robot;
a microphone that acquires sounds around the robot;
a processor;
a speaker; and
a driver that moves the robot; wherein the processor:
causes the apparatus to execute a withdrawal action, in which a third action is not executed as an initial action, according to at least one of a first captured image or an acquired sound when the at least one of the first captured image or the acquired sound is at least one of captured or acquired during a predetermined time and in a predetermined place;
causes the robot to execute the third action as the initial action, the initial action being executed for communication with the target person according to the at least one of the first captured image or the acquired sound when the withdrawal action is not executed, a second action being one-level higher than the third action, a first action being one-level higher than the second action;
when a first sound is acquired by the microphone after an execution of the initial action, causes the robot to execute the second action one-level higher than the third action;
when a second sound is acquired by the microphone after an execution of the second action, causes the robot to execute the first action one-level higher than the second action, the first action including the robot requesting the target person to execute a predetermined task;
when deciding, based on a second captured image, that the target person is not executing the predetermined task after the execution of the first action, causes the apparatus to again execute the first action;
when no sound is acquired by the microphone after the execution of the second action, determines whether a time elapsed from the execution of the second action is shorter than a threshold;
when the time is shorter than the threshold, causes the robot to continue the second action; and
when the time is equal to or longer than the threshold, causes the robot to execute the third action one-level lower than the second action,
the second action includes the speaker outputting a voice that talks to the target person, and the third action includes the driver causing the robot to move in synchronization with a motion of the target person.

\* \* \* \* \*